(12) United States Patent
Patel

(10) Patent No.: US 7,866,958 B2
(45) Date of Patent: Jan. 11, 2011

(54) SOLAR POWERED FAN

(76) Inventor: Amish Patel, 109 Executive Dr., Ambler, PA (US) 19002

( * ) Notice: Subject to any disclaimer, the term of this patent is extended or adjusted under 35 U.S.C. 154(b) by 102 days.

(21) Appl. No.: 11/616,004

(22) Filed: Dec. 25, 2006

(65) Prior Publication Data

US 2008/0152482 A1 Jun. 26, 2008

(51) Int. Cl.
*F04B 35/04* (2006.01)
*F04B 53/00* (2006.01)

(52) U.S. Cl. .............. 417/423.1; 417/423.15; 417/234; 417/411

(58) Field of Classification Search ............... 416/246, 416/63, 244 R; 417/423.1, 234, 411, 423.15; 415/121.3
See application file for complete search history.

(56) References Cited

U.S. PATENT DOCUMENTS

| | | | | |
|---|---|---|---|---|
| 1,971,827 A | * | 8/1934 | Morse | 417/423.1 |
| 2,510,181 A | * | 6/1950 | Jury | 24/521 |
| 3,353,191 A | * | 11/1967 | Dahly | 2/171.3 |
| 4,799,858 A | * | 1/1989 | Shin-Chin | 416/110 |
| 4,850,804 A | * | 7/1989 | Huang | 416/246 |
| 4,899,645 A | | 2/1990 | Wolfe et al. | |
| 4,974,126 A | | 11/1990 | Hwang | |
| 4,986,169 A | | 1/1991 | Chen | |
| 5,044,258 A | | 9/1991 | Wu et al. | |
| 5,148,736 A | | 9/1992 | Juang | |
| 5,250,265 A | | 10/1993 | Kawaguchi et al. | |
| 5,304,035 A | * | 4/1994 | Carter | 416/63 |
| 5,425,620 A | * | 6/1995 | Stroud | 416/63 |
| 5,522,943 A | * | 6/1996 | Spencer et al. | 136/245 |
| 5,588,909 A | | 12/1996 | Ferng | |
| 5,725,356 A | * | 3/1998 | Carter | 416/240 |
| 5,818,946 A | * | 10/1998 | Walter | 381/321 |
| 5,851,106 A | * | 12/1998 | Steiner et al. | 416/63 |
| 5,870,282 A | * | 2/1999 | Andre et al. | 361/683 |
| 6,032,291 A | | 3/2000 | Asenguah et al. | |
| 6,409,475 B1 | * | 6/2002 | Ho | 416/63 |
| 6,454,539 B1 | * | 9/2002 | Santos | 417/44.1 |
| 6,821,095 B2 | * | 11/2004 | Dooley et al. | 417/234 |
| 7,017,871 B2 | * | 3/2006 | Chen | 248/161 |
| 2003/0194335 A1 | * | 10/2003 | Chen | 417/423.1 |
| 2004/0062661 A1 | * | 4/2004 | Hajdasz | 417/234 |
| 2005/0058559 A1 | * | 3/2005 | Kasahara et al. | 417/423.7 |

FOREIGN PATENT DOCUMENTS

| | | |
|---|---|---|
| DE | 3337241 | 5/1984 |
| GB | 2241378 | 8/1991 |
| JP | 7253096 | 10/1995 |
| JP | 2003201990 | 7/2003 |

* cited by examiner

*Primary Examiner*—Charles G Freay
*Assistant Examiner*—Alexander B Comley
(74) *Attorney, Agent, or Firm*—Michael I Kroll

(57) ABSTRACT

A solar powered personal fan with a much broader spectrum of both portable and fixed operating applications whereas prior art is application specific. This device also provides a plurality of fixed and portable power supplies. A solar panel, rechargeable battery pack or home charger can all be used as a power supply to operate the present invention.

9 Claims, 13 Drawing Sheets

SOLAR POWERED FAN

BACKGROUND OF THE INVENTION

1. Field of the Invention

The present invention relates generally to fans and, more specifically, to a solar powered fan which provides a compact cylindrical housing that can be comfortably hand held. The small compact design can be easily stored and transported on one's person, in a brief case or beach bag.

The present invention also provides a small portable solar panel which can be used to directly power the fan motor or recharge the optional battery pack. A plurality of various length cables provides a conduit for power from the solar panel to the fan.

Additionally, the present invention provides a plurality of adjustable pitch mounting stands to constrain the fan to a variety of surfaces for stationary use.

2. Description of the Prior Art

There are other solar powered fan devices designed for personal cooling or ventilation. Typical of these is U.S. Pat. No. 4,899,645 issued to Wolfe, et al. on Feb. 13, 1990.

Another patent was issued to Hwang on Nov. 27, 1990 as U.S. Pat. No. 4,974,126. Yet another U.S. Pat. No. 4,986,169 was issued to Chen on Jan. 22, 1991 and still yet another was issued on Sep. 3, 1991 to Wu, et al. as U.S. Pat. No. 5,044,258.

Another patent was issued to Juang on Sep. 22, 1992 as U.S. Pat. No. 5,148,736. Yet another U.S. Pat. No. 5,250,265 was issued to Kawaguchi, et al. on Oct. 5, 1993. Another was issued to Ferng on Dec. 31, 1996 as U.S. Pat. No. 5,588,909 and still yet another was issued on Mar. 7, 2000 to Asenguah, et al. as U.S. Pat. No. 6,032,291.

Another patent was issued to Sibbe on May 30, 1984 as German Patent No. DE3337241. Yet another U.K. Patent No. GB2241378 was issued to Forsyth on Aug. 28, 1991. Another was issued to Takahashi on Oct. 3, 1995 as Japan Patent No. JP7253096 and still yet another was issued on Jul. 18, 2003 to Sha as Japan Patent No. JP2003201990.

A solar ventilator (1) is fittable to an edge (2) having first and second sides corresponding to first and second regions. The edge can be of a barrier, e.g. of a movable window of a motor vehicle or of a building. The ventilator has a suspension (5) for suspending the ventilator from the edge so that the ventilator will be adjacent the first region. The ventilator has a housing (4) having inlet and outlet portions (11, 12) for enabling air to be transferred therebetween from a region to the other region. A fan (13) is comprised by the housing so as to enable the transfer of air. A solar generator (15) drives the fan. The ventilator may be arranged for direct or indirect reception of solar radiation.

A lamp with a power source to supply a fan, comprising a light installation, a solar cell connected inside of the lampshade, a rechargeable battery to be charged with electrical power by means of the solar cell, and a small fan or other small electrical apparatus attached to the rechargeable battery. As the light installation uses alternating-current, radiation energy sent from the light bulb, is converted by the solar cell's photoelectric effect to provide current again to charge a rechargeable battery, thereby supplying the small fan or any other electrical apparatus (such as shaver, transistor radio) with the required power source to operate, and thereby save energy.

A vehicular internal fan ventilator, which includes a housing having set therein an internal ventilating chamber with a cross-flow air fan, a motor, a storage batteries and selector and a switch and a linkage to an oblique, external portion of housing which is fixedly mounted a solar cell board to collect solar energy for the motor and/or to charge the storage batteries. The housing comprises a top retainer rib and a bottom window glass channel for convenient installation in with a separate, flexible and cuttable packing strip in a car between door frame upper trim and window glass of a vehicle.

A motor-driven, window mounted portable fan with cigarette-lighter plug. The fan, or impeller, is mounted in an impeller housing which in turn is mounted centrally on one face of a window prop. The window prop is rectangular in shape and has lengthwise slideways on both of its sides. Extension pieces fit in the slideways so that the slideways can be lengthened to fit different sized windows. Opposite the impeller housing is a rain cover and a vent lid, which covers a vent. The vent lid is opened and closed by a motor, via an activation arm.

An automatic solar-powered car ventilator to be installed between the upper horizontal bar of the window sash and the upper horizontal edge of a movable window glass in a window in a car door having a main body and two auxiliary bodies extending from both sides of the main body to be cut to suit the width of the movable window glass. A ventilating means including a fan, a motor to drive the fan to suck in the open air and exhaust out the air in the car. A base to mount the fan and the motor and a housing to shield the fan, the motor and the base. A solar-energy board being combined with the main body or the ventilating means by means of two clamps on the board movably catching hold of either two holders on the main body or on the ventilating means to generate electricity to power the motor by absorbing the sunlight.

A deodorizer which comprises a deodorant member, an electric motor, a fan fixed to the electric motor, a receptacle having these members accommodated therein, and a solar cell provided in the receptacle and adapted to supply a driving electric power to the electric motor, whereby, owing to the blowing action of the fan, air is caused to enter the interior the receptacle from an air suction port and pass there through and is blown out from an air blowout port to outside the receptacle, and the air is caused to flow around a portion of the receptacle where the solar cell is installed.

A solar power-operated cooling system installed in a motor vehicle for circulation of air, including a solar power device having a plurality of photovoltaic cells mounted for converting the radiant energy of sunlight into electric power and a power output terminal for output of electric power from the photovoltaic cells, an electric connector having an input terminal connected to the power output terminal of the solar power device and at least two output terminals, at least one blowing fan and at least one exhaust fan respectively installed in the interior door panel assemblies of the motor vehicle and electrically connected to the output terminals of the electric connector and driven to draw fresh air into or to draw hot air out of the motor vehicle.

The present invention discloses an apparatus (10) for providing solar powered air circulation to the face and upper body of the user. A means for mounting photoelectric cells (16) to the apex of the top of a hat (12) is provided which cells 16 are connected by wire (24) to a directionally selective fan (14) which is located under the brim (18) of the hat (12). The fan (14) receives air transmitted through a conduit (20) under the brim of the hat (12) which has its air inlets (22) on the lateral edges of the brim (18) of the hat (12). The fan (14) is also provided with a horizontally movable axle (26) means whereby it is partially rotatable in the horizontal axis to selectively distribute the air. An alternative embodiment (30) is provided wherein the components of the present invention are assembled onto a modular semi-flexible frame (30) which can be attached to an existing favorite cap (12) by means of hook and loop material (36) thereby providing a portable cooling unit which can be easily attached to various hats.

The fan for producing wind or for cooling excessive temperatures is intended for direct and personal use by persons who are away from their usual premises and do not have any power mains supply available (for example train compartment etc.), but wish to protect themselves from or to alleviate excessive temperatures or their unpleasant attendant manifestations (including perspiration). The fans currently available commercially are fundamentally unsuitable for this. On the one hand they are too large and bulky—on the other hand they do not have an independent power supply, that is they are tied to buildings. The fan submitted in the present application, however, fulfils these substantive requirements. It is of light, handy design and is equipped with built-in and independent power supply facilities. These independent electrical energy sources in particular comprise an accumulator, with a charging device and a mains connection, a storage battery, also with a charging device and a mains connection, a dry battery and last but not least solar power on the basis of the photo-voltaic effect.

A portable air-conditioner using an electronic heat pump 3, e.g. a Peltier effect device, designed to run on solar or battery power and suitable for use in vehicles and similar confined spaces or carried as a personal comfort device. The air-conditioner can be left to operate unattended for long periods. The air-conditioner may be constructed with heat sinks 1, 2 and a fan 4 all contained in a casing with one or more electronic heat pumps 3, and may be powered by a solar panel or automobile accumulator. The casing may be fitted to a vehicle window frame using an attachment (11, FIG. 3).

PURPOSE: To realize the without place restriction by providing a fan motor and impellers in a housing, providing a lid body that is pivotingly supported at the housing and closes an air suction opening or an exhaust opening, and driving the fan motor by means of the power generation output of a solar battery provided on a surface that is exposed at the time of lid body opening. CONSTITUTION: An air suction opening 2 is formed on one surface of a housing 1 of a rectangular box shape, and an exhaust opening is formed on the other surface of the housing 1, and on the inside, a fan motor 4 is provided. Plural impellers 6 are provided at an approximately bowl-like rotor 5 to be rotated by means of the fan motor 4. A lid body 27 is openably/closably supported at the lower side edge of the air suction opening 2 of the housing 1, and a solar battery 28 is provided on a surface to be exposed at the time of lid body 27 opening. The solar battery 28 is made up of, for example, plural amorphous solar battery cells that are arranged in a surface state and are connected to each other in series, parallel or in the combination of these, and wiring is conducted so that the fan motor 4 may be driven by means of its power generation output. Thus, this portable type blower can be used simply without receiving place restriction.

PROBLEM TO BE SOLVED: To provide an easily carriable fan with solar panels which can be used outdoors with no power supply.

While these solar devices may be suitable for the purposes for which they were designed, they would not be as suitable for the purposes of the present invention, as hereinafter described.

SUMMARY OF THE PRESENT INVENTION

A primary object of the present invention is to provide a solar powered personal fan.

Another object of the present invention is to provide compact round housing that can be comfortably hand held. The housing also provides a hemispherical threaded cap with a cable jack for powering the fan by means of a solar panel. A switch with a serrated sliding operator, that is flush with the cylindrical surface of the fan housing controls power to the fan motor.

Yet another object of the present invention is to provide a small, portable solar panel to either power the fan directly or recharge the optional battery pack.

Still yet another object of the present invention is to provide optional battery pack to increase the portability of the present invention. The battery pack provides a means for using the fan in applications where conjunction of the present invention to the solar panel would not be practical. Such situation would include use on public transportation such as a bus, train or taxi.

Another object of the present invention is to provide a plurality of stands for constraining the fan housing for stationary use. One such stand provides a circular base comprised of a ball joint and a semi circular surface or cradle to support the fan for stationary use. Two holes in the base provide a means of permanently constraining the base to any surface with screw type fasteners. Plugs mounted to the base by a flexible tab provide a method to conceal these holes when the base is used for portable applications of the present invention. A spring loaded clip style base also provides a method of temporarily constraining the fan to a plurality of surfaces. The clip style base provides two rectangular plates held together at a hinged fastening point. A torsion spring provides the force to grip a surface between the mating points of the clip plates. The top plate provides a ball joint with a cradle similar to the previously mention base.

Yet another object of the present invention is to provide a battery charger that can be plugged into any outlet in the home or office for an additional method of charging the optional battery pack when use of the solar panel is not practical. This charger also provides a method for charging a plurality of battery packs for extended portable use of the present invention. Cable used for powering the fan from the solar panel may also be used with this charger.

Still yet another object of the present invention is to provide a leather protection cover to secure and protect the cells of the solar panel. A belt clip on the case provides a method of securing the cover to the user belt.

Additional objects of the present invention will appear as the description proceeds.

The present invention overcomes the shortcomings of the prior art by providing a solar powered personal fan with a much broader spectrum of both portable and fixed operating applications whereas prior art is application specific. This device also provides a plurality of fixed and portable power supplies. A solar panel, rechargeable battery pack or home charger can all be used as a power supply to operate the present invention.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
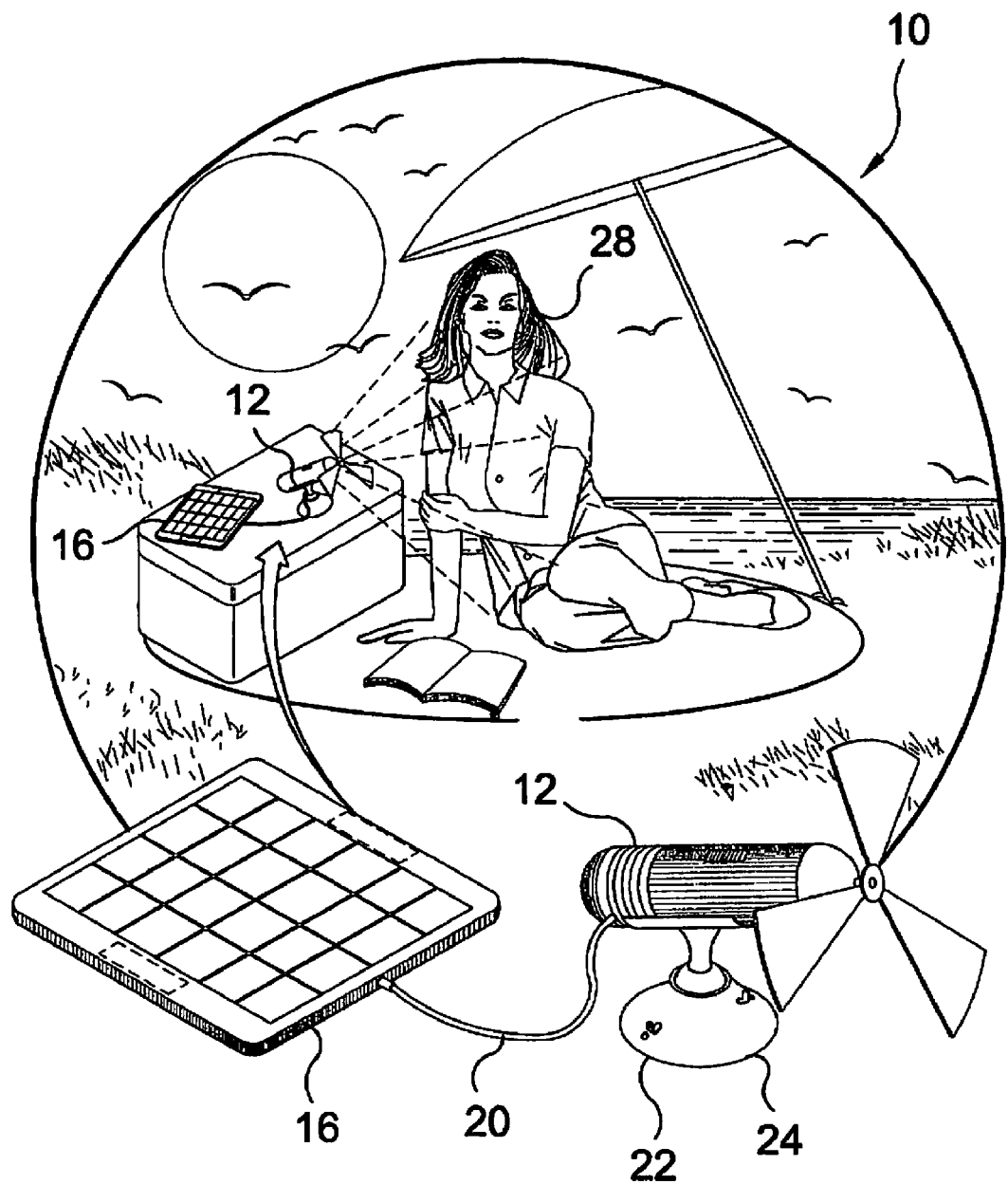
FIG. 1 is an illustrative view of the present invention in use.

Turning now descriptively to the drawings, in which similar reference characters denote similar elements throughout the several views, the figures illustrate the Portable Solar Powered Fan with Alternate Charging and Powering Means of the present invention. With regard to the reference numerals used, the following numbering is used throughout the various drawing figures.

10 Portable Solar Powered Fan with Alternate Charging and Powering Means of the present invention
12 portable fan
14 housing of 12
16 solar panel
18 solar cell
20 power cable
22 base member
24 base stand
26 base clip
28 user
30 cable jackport
32 interchangeable power adapter
34 power switch
36 tape or Velcro placement area
38 ball and socket joint
40 hardware recess
42 flexible flap of 24
44 plug of 42
46 fan cradle
48 base of 24
50 top plate of 26
51 pivot plate
52 bottom plate of 26
53 pivotable connection
54 pivot point of 26
56 torsion spring
58 vulcanized rubber coating
60 positive terminal point
62 negative terminal point
64 rechargeable battery pack
66 motor
68 fan blade
70 household outlet
72 charging unit
74 solar panel cover
76 cable jack access recess
78 clear plastic
80 cover flap
82 belt clip of 74
84 belt

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

FIG. 1 is an illustrative view of the present invention 10 in use. The present invention is a portable, compact solar powered fan 10 that can be used indoors or outdoors, on public transportation such as buses or commuter trains and in private vehicles. The fan 12 is powered by a small solar panel 16 or with an optional rechargeable battery pack. A length of electrical cable 20 provides that the fan 12 can be deployed at a distance from the solar panel 16 determined by the length of cable 20. A plurality of base members 22 provide a means of constraining the fan for stationary applications. Shown is the user 20 employing a base stand 24 to hold the fan 12.

Figure 2:
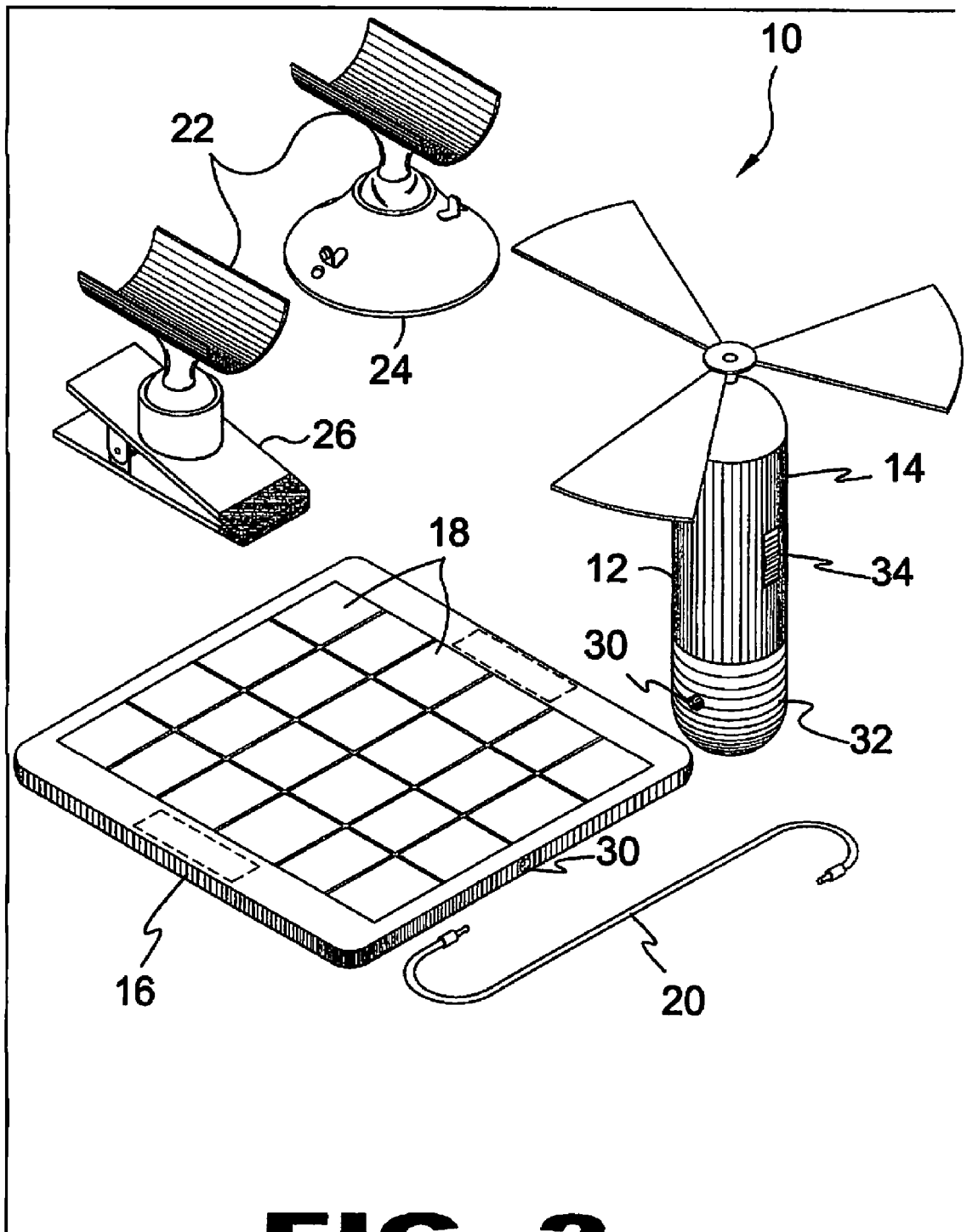
FIG. 2 is a perspective view of the present invention.

FIG. 2 is a perspective view of the present invention 10. Shown is the portable compact solar powered fan 12 of the present invention 10 that includes a solar panel 16 comprising a plurality of solar cells 18, a pair of adjustable pitch base members 22 including a base stand 24 and a base clip 26. A length of electrical cable 20 communicates between cable jacks 30 integral with the solar panel 16 and the fan 12. Optionally, the fan can be powered by replacing the interchangeable power adapter 32 with a rechargeable battery pack. A power switch 34 is disposed on the housing 14 of the fan 12.

Figure 3:
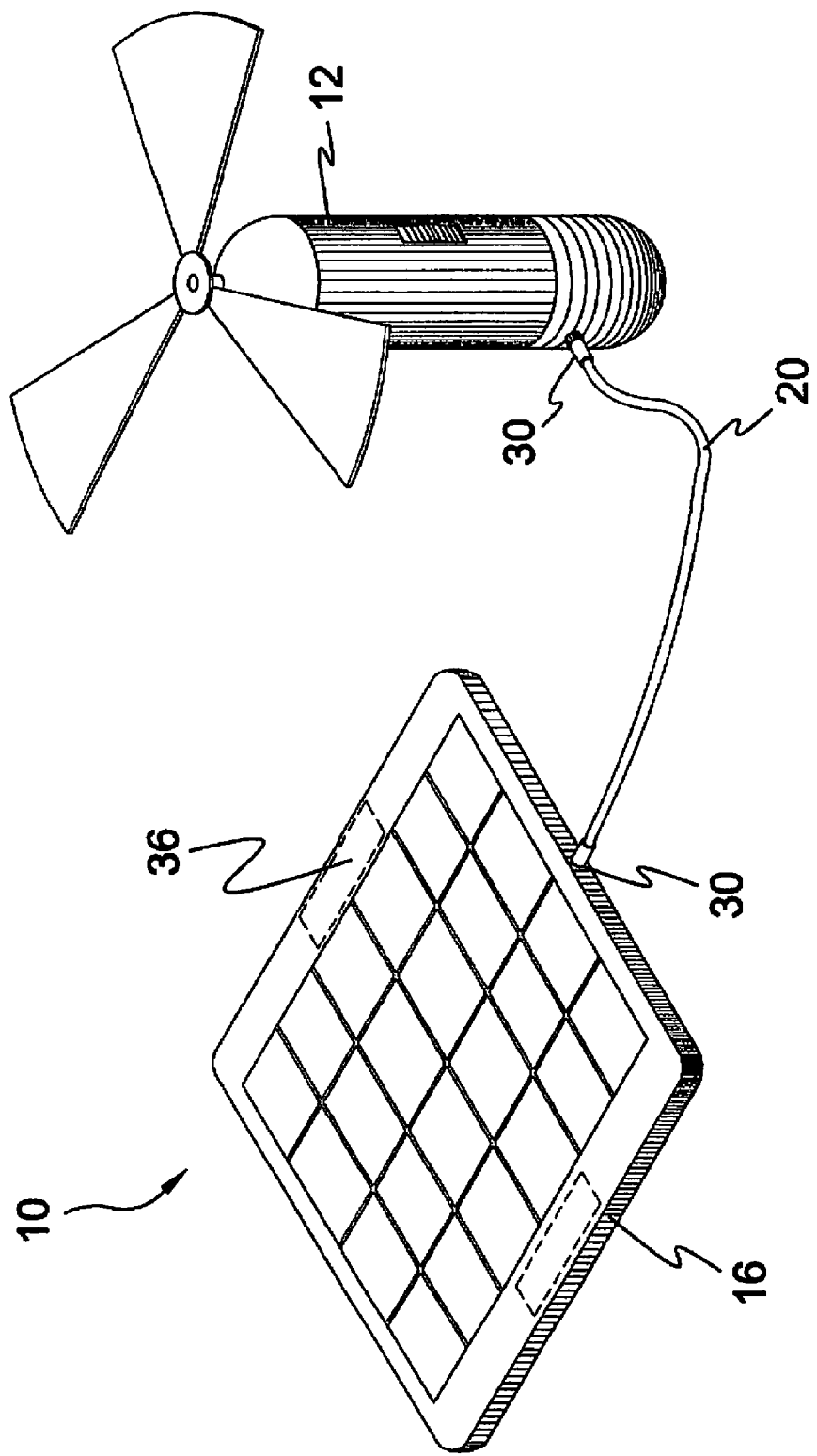
FIG. 3 is a perspective view of the present invention assembled.

FIG. 3 is a perspective view of the present invention 10 assembled. Shown is the portable, compact solar powered fan 12 with the cable 20 connected cable jacks 30 of the fan 12 and the solar panel 16. Various lengths of cable 20 are available to satisfy the user's preference for a variety of applications. A tape or Velcro placement area is located on the bottom of the solar panel 16 to prevent the inadvertent movement thereof.

Figure 4:
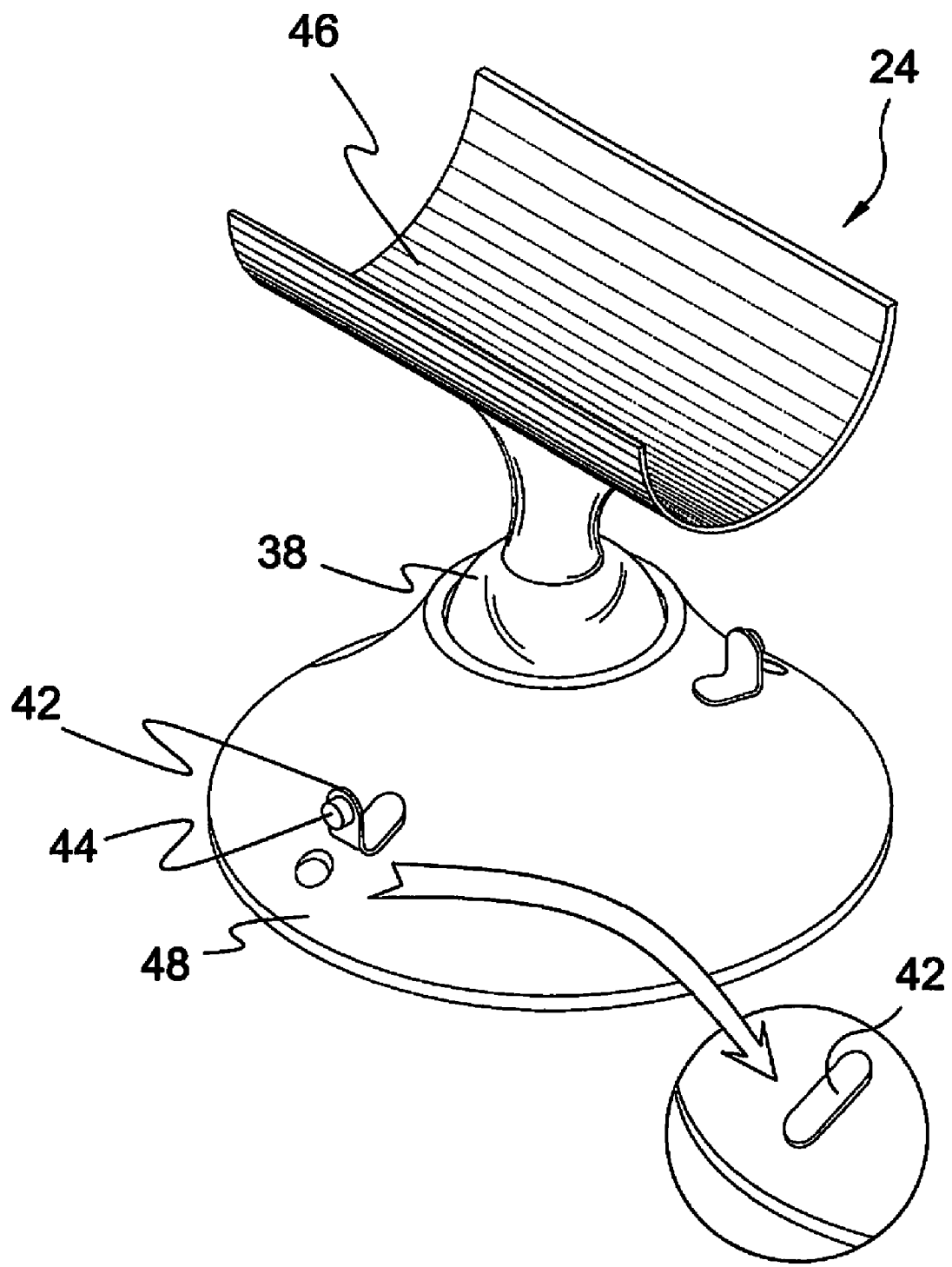
FIG. 4 is a perspective view of a fan holder of the present invention.

FIG. 4 is a perspective view of a base member 22 of the present invention. Shown is the base stand 24 with a ball and socket joint 38 that allows the fan cradle 46 to pitch to a desired angle. Hardware recesses 40 in the base 48 provide a method for constraining the base stand 24 to a flat surface with common fasteners such as screws or small bolts. Flexible flaps 42 with plugs 44 conceal the recesses 40 for portable use of the base stand 24.

Figure 5:
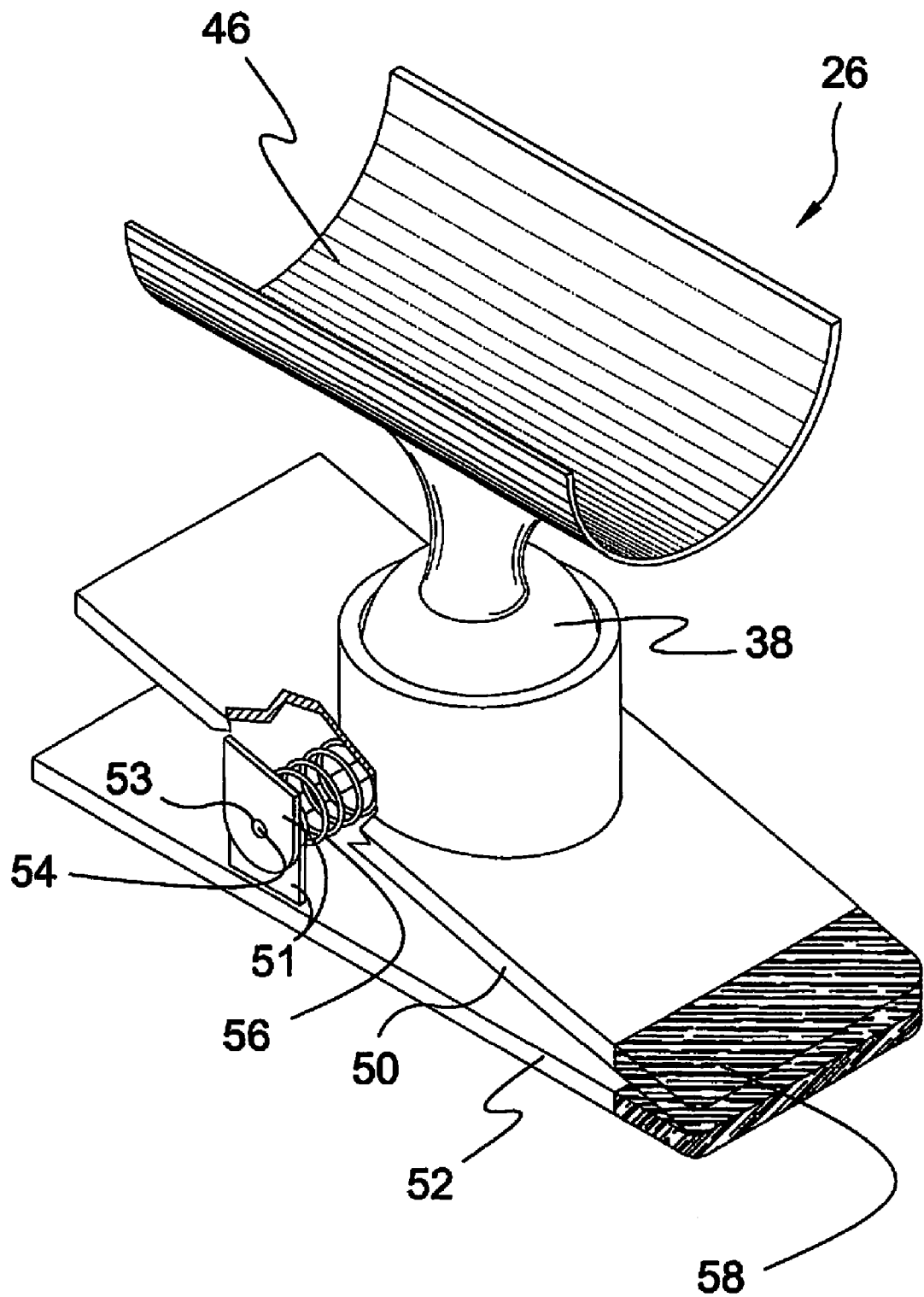
FIG. 5 is a perspective view of a second fan holder of the present invention.

FIG. 5 is a perspective view of a base clip 26 of the present invention. Shown is another portable, compact solar powered fan holder having a base clip 26 with a ball and socket joint 38 that allows the fan cradle 46 to pitch to a desired angle. The base clip 26 allows the user to clip the fan to any object or surface within the limits of the clip in the open position. A torsion spring 56 concentrically constrained along the axis of the pivot point 54 provides the force to grip a surface between the top plate 50 and the bottom plate 52 of the base clip 26. Vulcanized rubber coating 58 on the plate ends provide additional adhesion and prevent any lateral movement of the base clip 26. The pivot point 54 comprises a pair of opposing pivot plates 51 extending both from said top plate 50 and said bottom plate 52 in overlapping fashion and have a pivotable connection 53.

Figure 6:
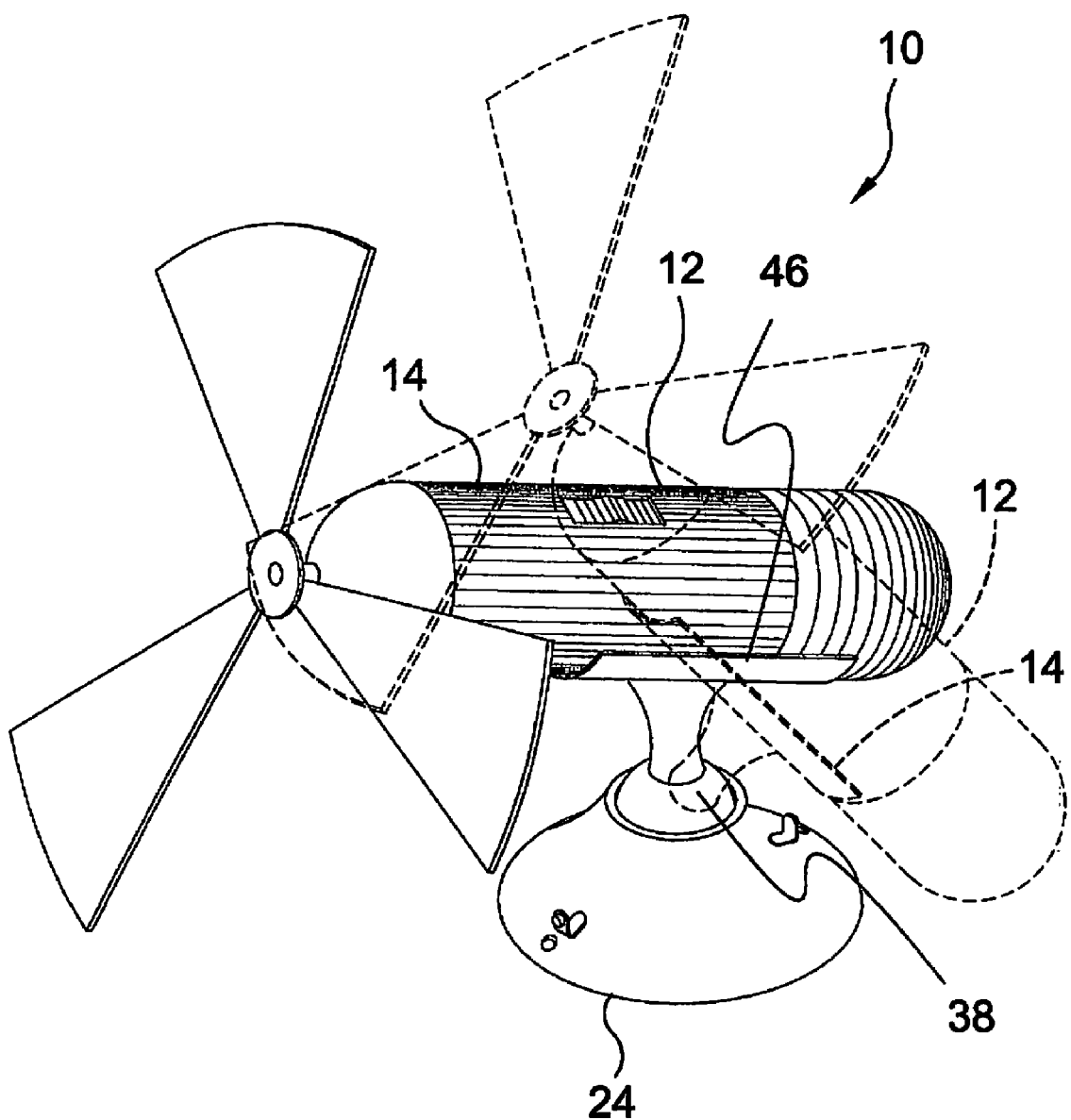
FIG. 6 is a perspective view of a fan holder of the present invention.

FIG. 6 is a perspective view of the present invention 10. Shown is the solar powered fan 12 in a stationary application with the base stand 24. The fan housing 14 is clipped into the cradle 46 and retained by a friction fit therebetween. The fan 12 and cradle 46 may then be rotated or pitched about the center point of the ball joint 38.

Figure 7:
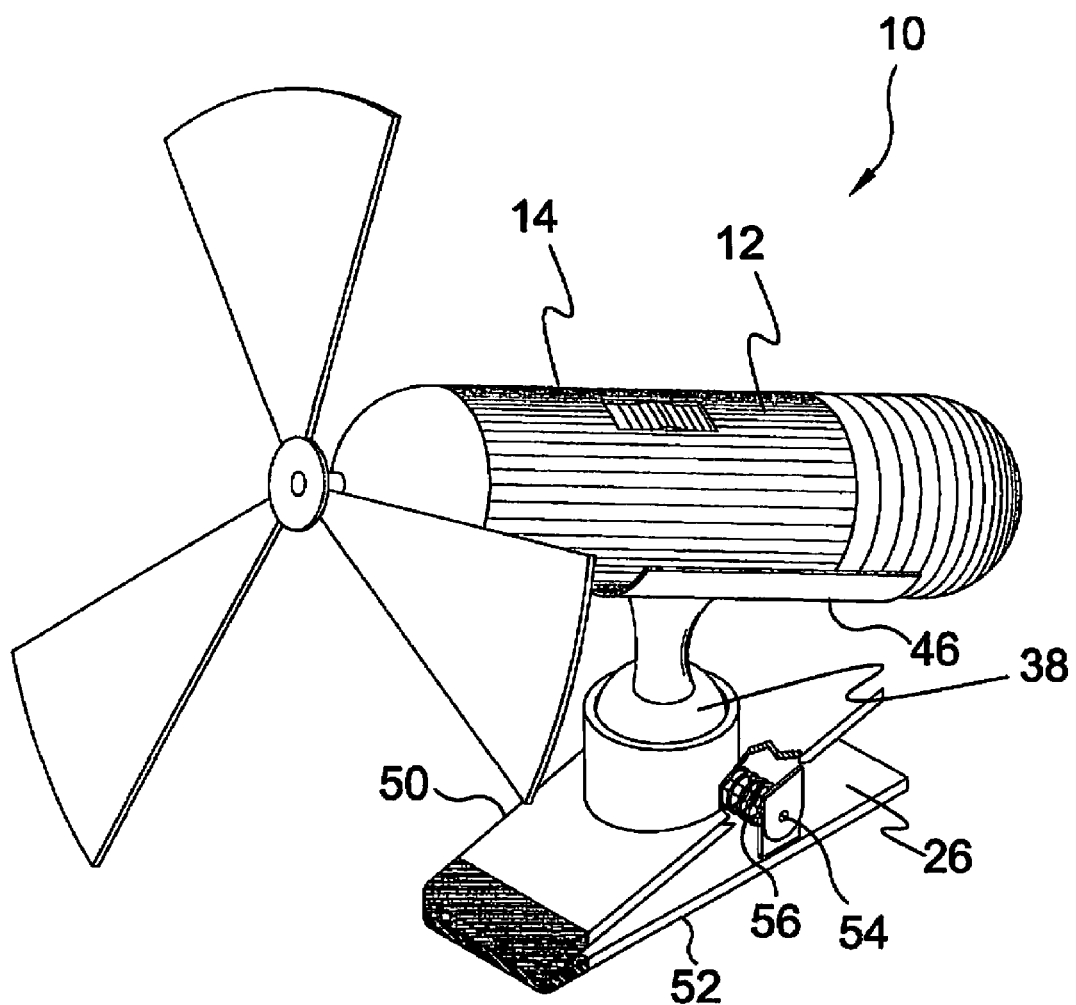
FIG. 7 is a perspective view of a second fan holder of the present invention.

FIG. 7 is a perspective view of a second fan holder of the present invention 10 in use. The second fan holder is a base clip 26 comprises a top plate 50 and a bottom plate 52 having a torsion spring 56 disposed at the pivot point 54 and is used to constrain the base 26 to a surface or object. The housing 14 of the fan 12 is clipped into the cradle 46 and retained by a friction fit between the cradle 46 and housing 14. The fan 12 and cradle 46 may then be rotated or pitched about the center point of the ball joint 38.

Figure 8:
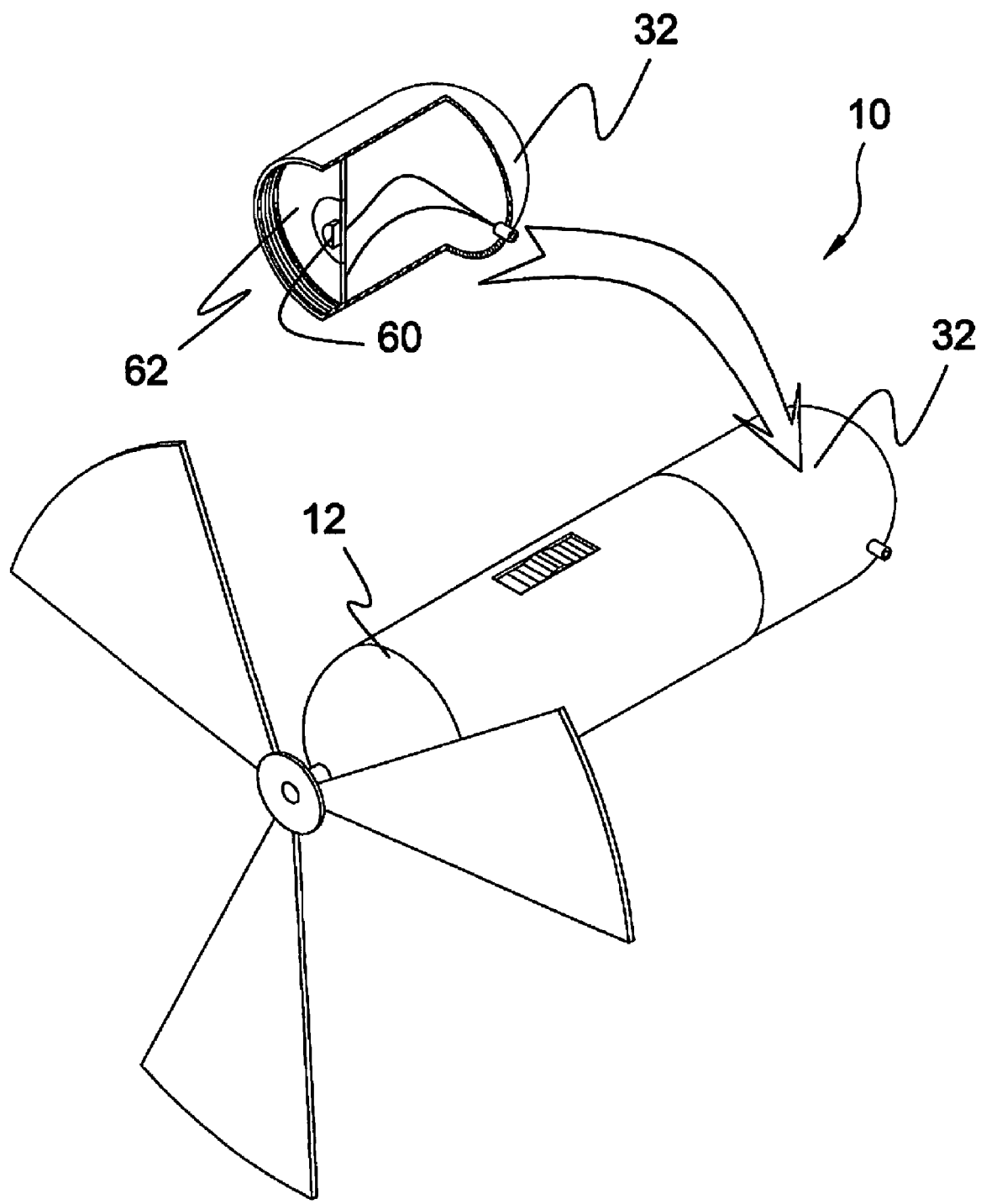
FIG. 8 is a perspective view of the present invention.

FIG. 8 is a perspective view of the present invention 10. Shown is the portable, compact solar powered fan 12 having an interchangeable power adapter 32 provides a connection point to operate the fan directly from the solar panel. Optionally the fan 12 can be powered by rechargeable battery pack with appropriate circuit and switch means for user selectable fan power source. The configuration of the positive terminal point 60 and the negative terminal point 62 and connection points that supply power to the motor are identical for both the power adapter 32 and the rechargeable battery pack.

Figure 9:
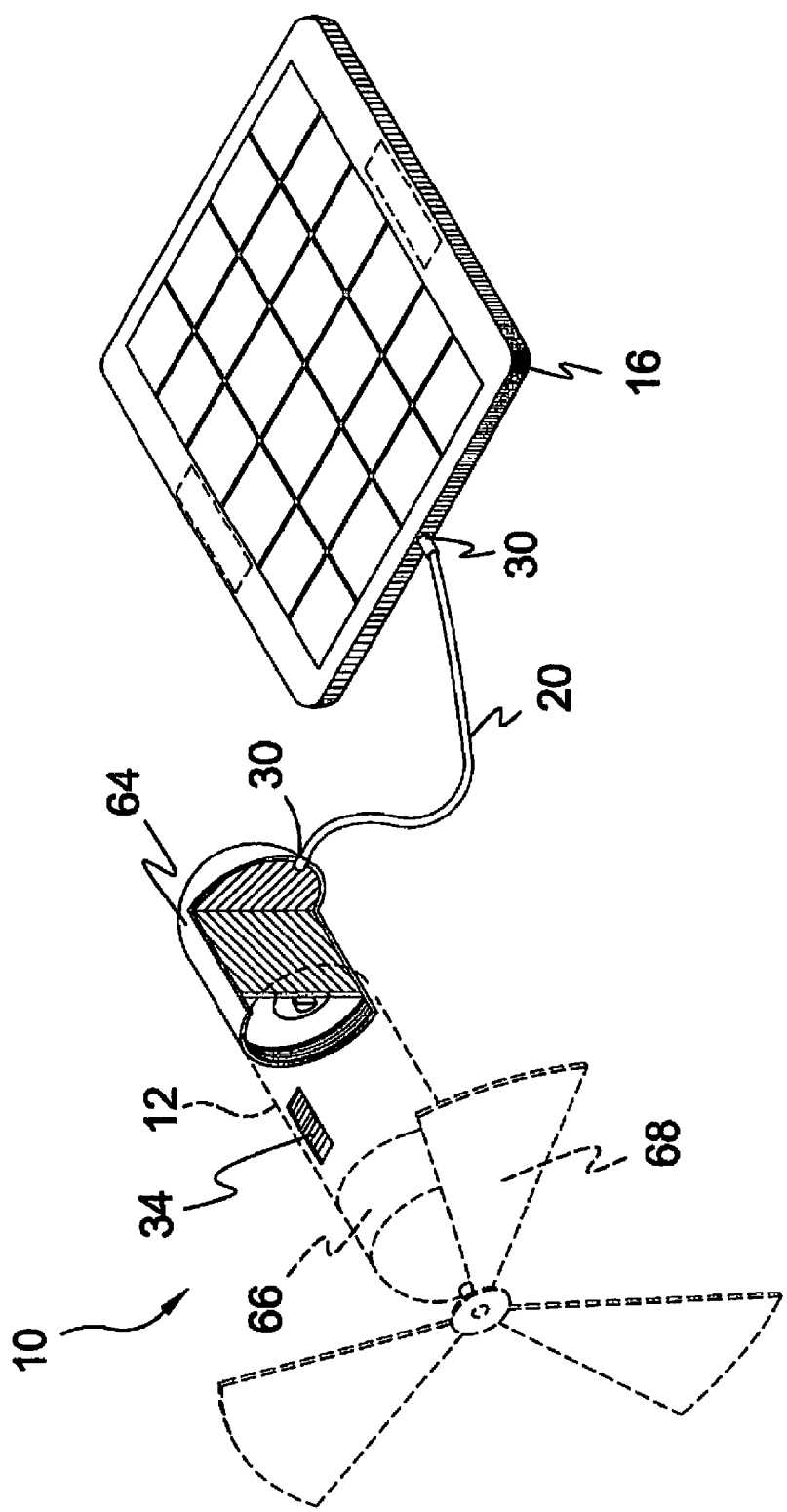
FIG. 9 is a perspective view of the present invention.

FIG. 9 is a perspective view of the present invention 10. A rechargeable battery pack 64 may be used to replace the interchangeable power adapter to power the motor 66 to drive the fan blades 68. This provides a means of total portability of the fan unit 12 without the solar panel 16. The solar panel 16 may also be used to recharge the battery pack 64 when the cable 20 is plugged into the respective cable jacks 30 and the fan 12 is not in operation.

Figure 10:
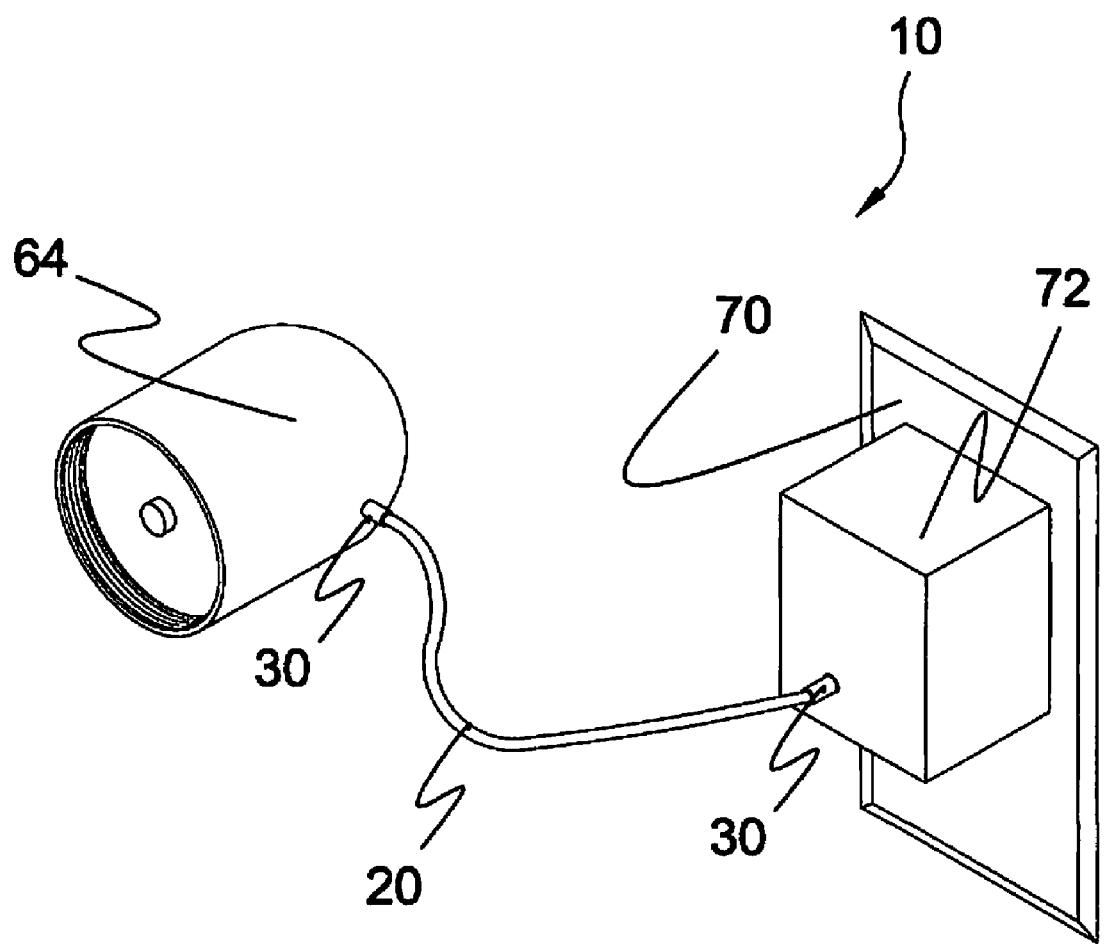
FIG. 10 is a perspective view of the present invention.

FIG. 10 is a perspective view of the present invention 10. Optionally, the rechargeable battery pack 64 may be charged from a household outlet 70. The present invention 10 is also supplied with a transformer type charger 72 for use with household outlets. The same cables 20 used to power the unit from the solar panel are used with this additional charging unit 72 by plugging it into the respective jacks 30.

Figure 11:
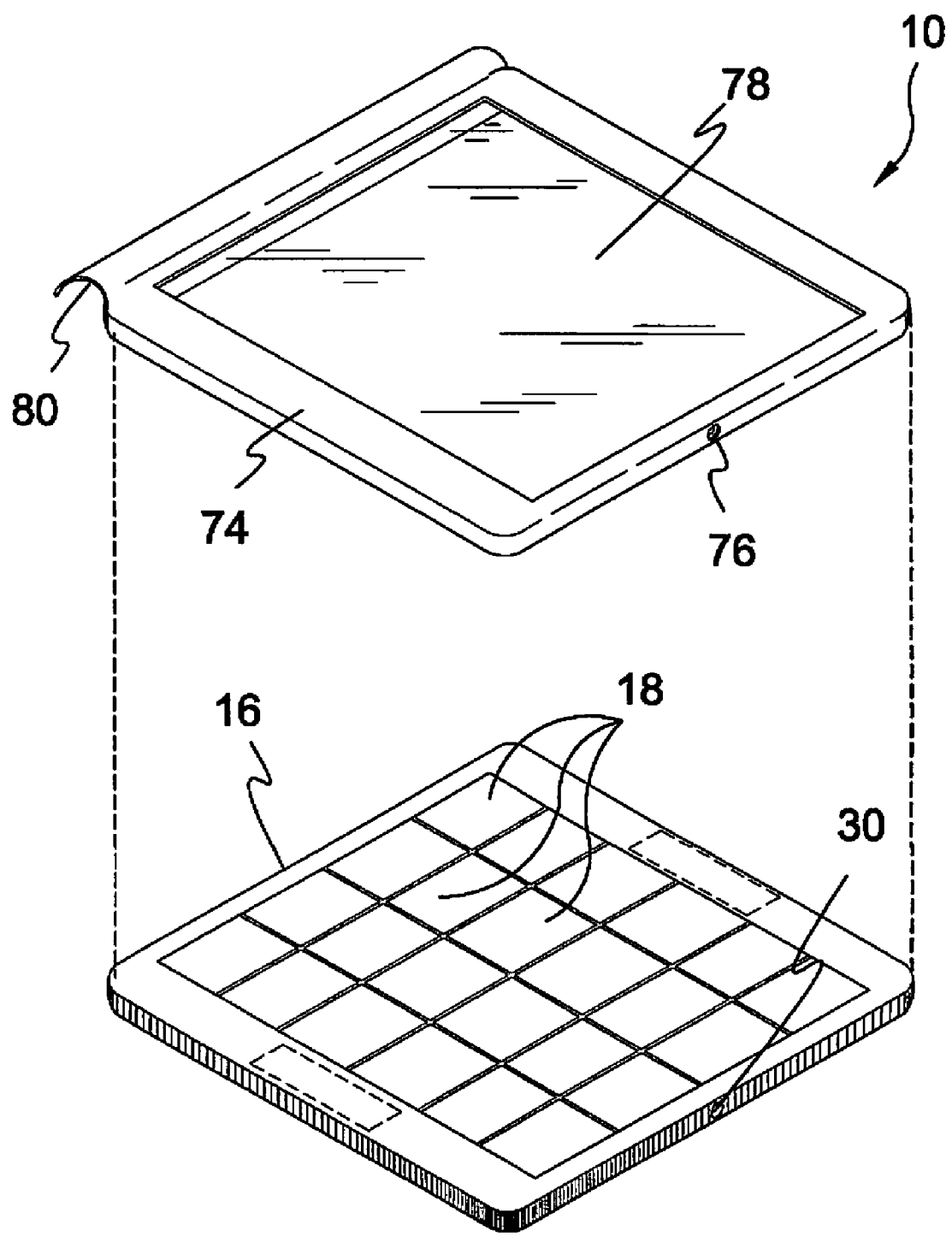
FIG. 11 is a perspective view of the present invention.

FIG. 11 is a perspective view of the solar panel 16 of the present invention 10. Shown is the portable, compact solar panel 16 including a leather protection cover 74 to secure and protect the solar cells 18. The cover 74 is installed via a Velcro flap 80 that allows for a firm fit and provides a cable port access recess 76 to allow for the cable connection. The cell 18 portion of the cover 74 is a clear plastic material 78, allowing direct radiant energy penetration to the cells 18.

Figure 12:
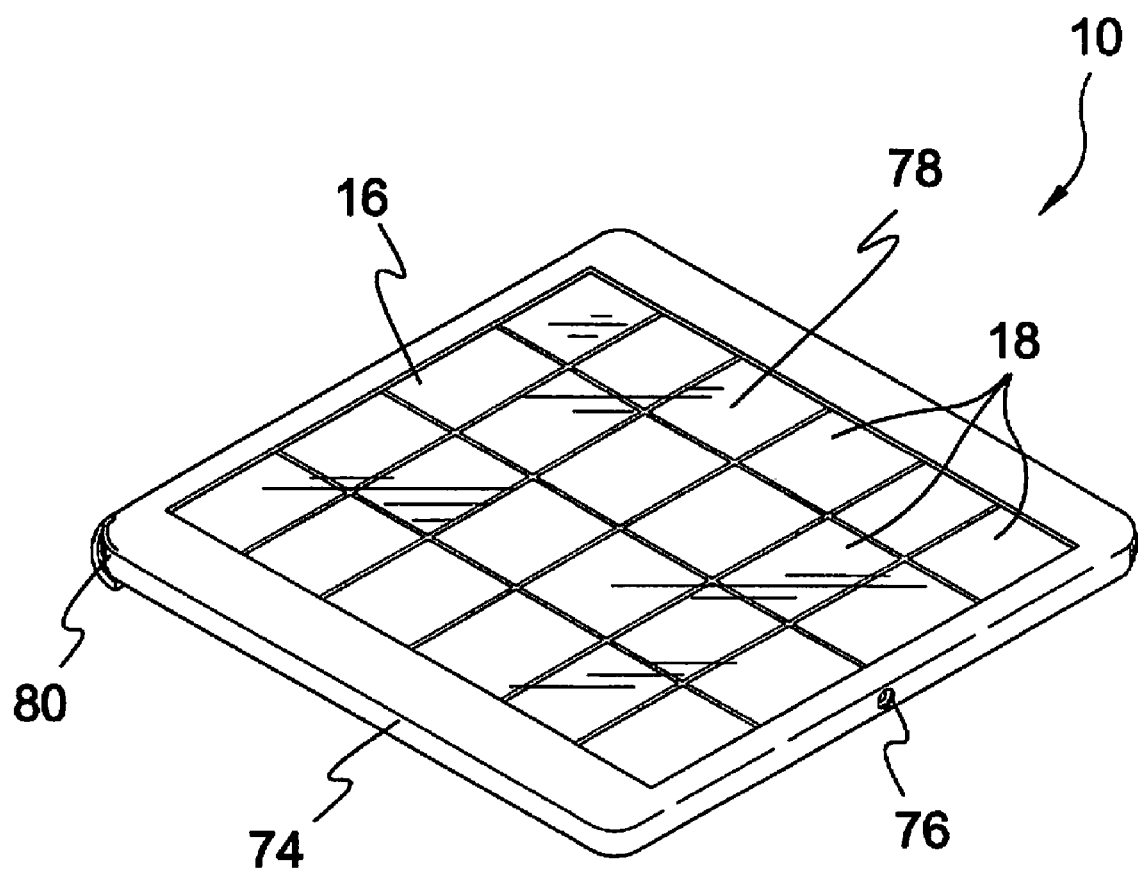
FIG. 12 is a perspective view of the present invention within its case.

FIG. 12 is a perspective view of the solar panel 16 of the present invention 10 with the leather protection cover 74 installed with the Velcro flap 80 to secure and protect the solar cells 18. The cover 74 allows for a firm fit and provides a cable port access recess 76 to allow for the cable connection. The cell portion of the cover 74 is a clear plastic material 78, allowing direct radiant energy penetration to the cells 18.

Figure 13:
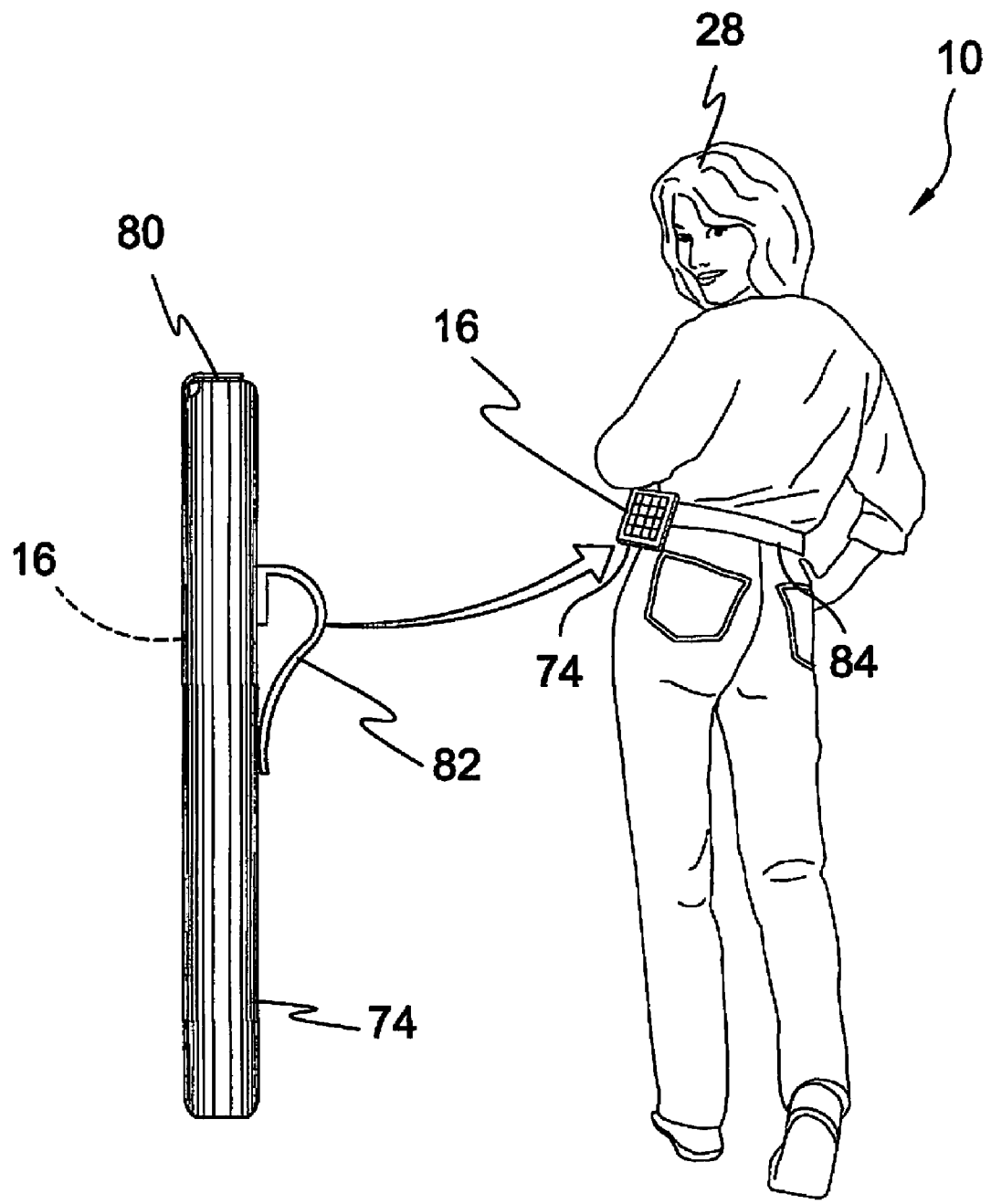
FIG. 13 is an illustrative view of the present invention within its case and clipped to a user's belt.

FIG. 13 is an illustrative view of the solar cover 16 within its cover 74 and clipped to the belt 82 of the user 28 and secured therein by the Velcro cover flap 80. The belt clip 84 is provided for convenient carrying by a user 28.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention

The invention claimed is:

1. A portable, solar powered fan comprising:
   a) a housing having a cylindrical shape with front and rear ends;
   b) a motor enclosed within said housing;
   c) a plurality of externally disposed rotary fan blades connected by a shaft along a central axis of said housing extending through said front end in mechanical communication with said motor;
   d) the rear end of said housing comprising a removable and interchangeable power adapter connected to said housing by threads;
   e) a rechargeable battery pack for replacing said interchangeable power adapter when said interchangeable power adapter has been removed from said housing, said rechargeable battery pack being substantially cylindrical and aligned with and directly connected to said cylindrical housing, said rechargeable battery pack connected to said housing by threads;
   f) a solar panel for harvesting solar energy and delivering electric power to said motor, said solar panel connected by a cable to said power adapter;
   g) a user operated switch externally disposed on said housing for selectively delivering power to said motor;
   h) an adjustable base member for retaining said fan in a selectively fixed position when hand held operation is not desirable;
   i) said interchangeable power adapter being substantially cylindrical and aligned with and directly connected to said cylindrical housing providing connection points to operate said fan directly from said solar panel or from the rechargeable battery pack replacing said interchangeable power adapter, said connection points being identical for both direct solar panel usage and said rechargeable battery pack; and
   j) a leather solar panel protector cover having a clear plastic window over said solar panel, said cover secured to said solar panel with hook and loop fastener elements, said cover having a cable jack recess to provide access to said cable when said cover is installed on said solar panel, said cover further including a belt clip to enable a user to wear said solar panel on an article of clothing for providing solar generated electricity directly to said fan.

2. The portable solar powered fan recited in claim 1, wherein said adjustable base member comprises:

a) a semi-circular cradle conforming substantially to the size and shape of said fan housing and releasably encompassing said cylindrically shaped housing for supporting said housing from a side of said housing;
b) a base portion; and
c) a ball and socket joint connecting said cradle to said base.

3. The portable solar powered fan recited in claim 2, wherein said base member has multiple configurations including:
a) a free-standing base member, and b) a base clip member.

4. The portable solar powered fan recited in claim 3, wherein said free-standing clip comprises a substantially circular base portion supporting said ball joint.

5. The portable solar powered fan recited in claim 4, wherein said base portion of said free-standing base member further includes a plurality of hardware recesses for securing said base member to a surface.

6. The portable solar powered fan recited in claim 5, wherein each said hardware recess has a corresponding flexible flap having a first end bonded proximal to said hardware recess and a second end having a plug member for insertion into said recess for aesthetic purposes when hardware isn't used therein.

7. The portable solar powered fan recited in claim 3, wherein said base clip member has a clip base comprising:
a) a top plate having a first end and a second end with said ball joint disposed on the top portion thereof and a pair of opposing pivot plates projecting perpendicularly downward from a central portion of the sides thereof;
b) a bottom plate having a first end, a second end and a pair of opposing pivot plates projecting perpendicularly upwards, said first end, second end and the pivot plates corresponding with those of said top plate and designed to overlap therewith;
c) pivot point connections pivotally connecting said pivot plates, said ball joint being connected to said top plate substantially over an axis of rotation of said top plate; and
d) a torsion spring disposed between said pivot plates that are configured to apply a bias against the interior surfaces of said top plate and said bottom plate thereby urging them away from one another and consequently forcing said second ends to clamp down upon each other until the bias is overcome by the user pressing said first ends together to engage and disengage said base clip to an appropriate planar surface.

8. The portable solar powered fan recited in claim 7, wherein said second ends of said top plate and said bottom plate have a vulcanized rubber coating to prevent the lateral movement thereof when clipped to a planar surface.

9. A method of operating a cooling fan comprising the steps of:
a) enclosing a motor for said fan in a housing having a cylindrical shape with front and rear ends, with a plurality of externally disposed rotary fan blades connected by a shaft along a central axis of said housing extending through said front end in mechanical communication with said motor, and the rear end of said housing comprising an interchangeable power adapter substantially cylindrical and aligned with and directly connected to said cylindrical housing via threads;
b) using a solar panel for harvesting solar energy and delivering electric power to said motor, said solar panel connected by a cable to said power adapter, a user operated switch externally disposed on said housing for selectively delivering power to said motor;
c) using said interchangeable power adapter to provide connection points to operate said fan directly from said solar panel, removing said interchangeable power adapter, replacing said interchangeable power adaptor with a rechargeable battery pack, connecting said rechargeable battery pack to said housing via threads, said connection points being identical for both direct solar panel usage and said rechargeable battery pack; and
d) mounting said solar panel in a leather solar panel protector cover having a clear plastic window over said solar panel, said cover secured to said solar panel with hook and loop fastener elements, said cover having a cable jack recess to provide access to said cable when said cover is installed on said solar panel, said cover further including a belt clip to enable a user to wear said solar panel on an article of clothing for providing solar generated electricity directly to said fan.

\* \* \* \* \*